United States Patent [19]

Hampson et al.

[11] 4,449,042
[45] May 15, 1984

[54] REDEEMABLE CONTAINER WITH END CLOSURE REDEMPTION CODE

[75] Inventors: Alfred A. Hampson, Portland, Oreg.; Thomas B. Hutchins, deceased, late of Portland, Oreg., by Nancy K. Hutchins, executrix

[73] Assignee: Can and Bottle Systems, Inc., Portland, Oreg.

[21] Appl. No.: 353,365

[22] Filed: Mar. 1, 1982

[51] Int. Cl.³ .............................................. G06K 7/10
[52] U.S. Cl. ..................................... 235/464; 235/494
[58] Field of Search ................................. 235/464, 494

[56] References Cited

U.S. PATENT DOCUMENTS 3,864,548  2/1975  O'Neil .................................. 235/464
3,923,158  12/1975  Fornàà .................................. 235/464
3,991,883  11/1976  Hobler .................................. 209/73
4,250,405  2/1981  Ashcroft ............................... 235/464

Primary Examiner—Harold I. Pitts
Attorney, Agent, or Firm—Kolisch, Hartwell, Dickinson & Anderson

[57] ABSTRACT

A redeemable carbonated beverage can on the lid of which there is provided a pair of spaced, redundant, arcuately distributed code patches containing regional redemption information. The code patches are read by a scanning laser beam. These patches may be formed in several different ways, as by impressing them, embossing them, or printing them. Information in the patches may be coded in any convenient manner, as, for example, in a binary-type code or in a frequency-type code.

9 Claims, 6 Drawing Figures

U.S. Patent  May 15, 1984  4,449,042
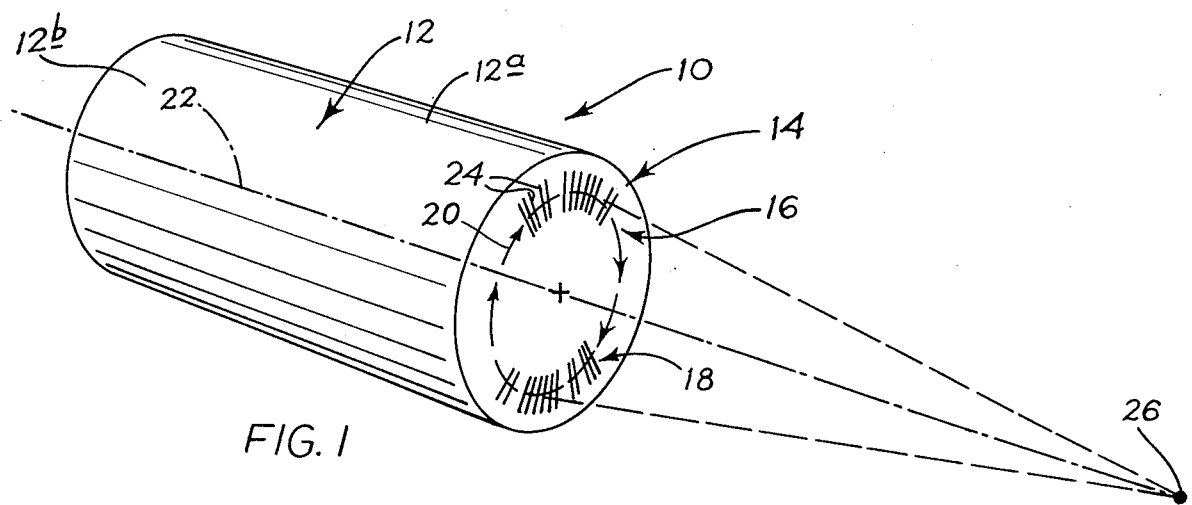
FIG. 1
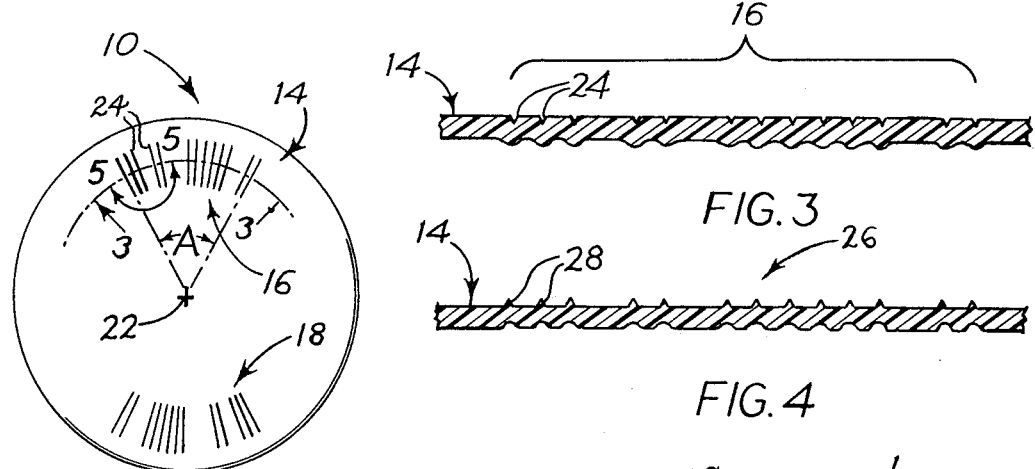
FIG. 2
FIG. 3
FIG. 4
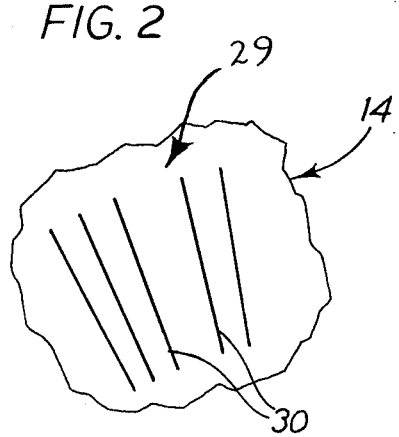
FIG. 5
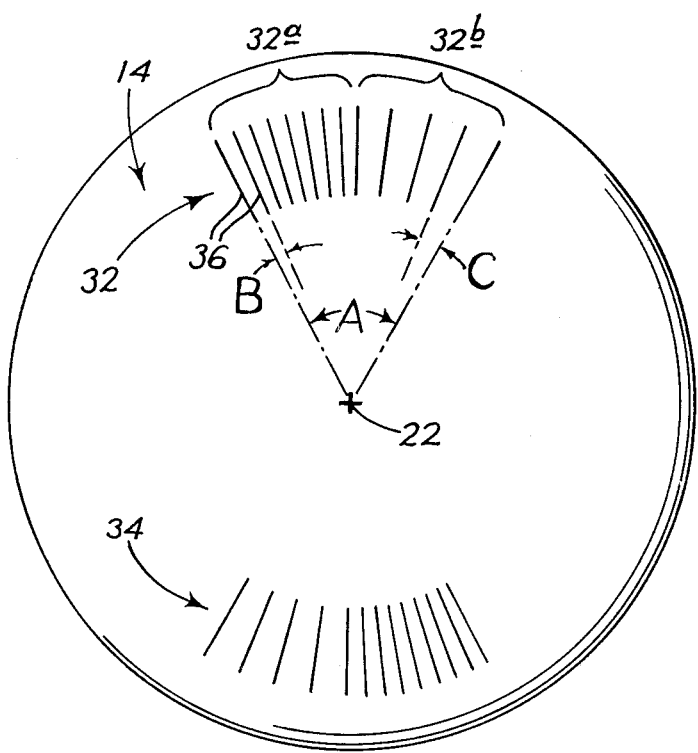
FIG. 6

REDEEMABLE CONTAINER WITH END CLOSURE REDEMPTION CODE

BACKGROUND AND SUMMARY OF THE INVENTION

This invention relates to construction in a carbonated beverage container, and more particularly to a unique lid structure which carries an electromagnetic-wave-readable, regionally unique redemption code.

In recent past years, several states have adopted mandatory deposit statutes under which beverage containers, glass, metal, and plastic, are required to "carry" a monetary deposit which is intended to encourage return and recycling of a container after use. Generally speaking, such legislation has been highly successful in promoting return, but also, has resulted in the usual redemption market outlets having to devote considerable space and time to redemption handling.

Considering, for a moment, the metallic can sector of beverage containers, this, at the present, makes up a large part of the beverage container population. Such cans usually include two main parts—a unitary body (side wall and base) and an attached lid. Each body is printed with a universal product code (UPC) which, among other things, uniquely identifies the product for which the ultimate can is intended, and the producer. UPC information for a given product is uniform throughout the states.

Can lids are manufactured separately, and are assembled into bodies during a canning operation. Lids which are to be used in each of the several different mandatory deposit states are printed separately with the appropriate state name and redemption amount.

In light of the enormous redemption task engendered by such deposit statutes, much considertion has been given to the successful development and utilization of some sort of automatic redemption system, such as a can redemption system, which will offer high-speed economical return handling. Among the important considerations relating to such a system are (1) its ability to determine that a returned can is properly redeemable in the particular state where the system is used, and (2) its ability to identify returned cans according to their different sources of origin.

A general object of the present invention, therefore, is to provide, for a beverage can body of the kind generally described a unique lid joinable with such a body, which lid bears an electromagnetic-wave-readable redemption code appropriate to the particular state wherein redemption is to take place, and/or to the particular producer of the can's contents.

According to a preferred embodiment of the invention, such a lid is proposed on which there is formed, at two arcuately displaced locations, an optically readable code patch which takes the form of radially extending linear code elements whose arrangement pattern contains the desired coded information. Two different kinds of codes, among many, seem to offer special promise for this purpose—one of these being a binary-type code, and the other being a frequency-type code.

Three different types of code structures are described herein. One takes the form of radially-extending linear indentations, or valleys, in a lid. Another takes the form of similar radially extending linear ridges which project outwardly. And a third takes the form of reflectance-contrasting printing on the outer face of a lid, also in the form of radially extending lines.

While different forms of electromagnetic radiation may be used to read such a code, the one which is disclosed herein takes the form of a circularly swept laser beam whose impingement with a can lid is reflected, through a suitable optical system, onto a photodetector.

While a single code patch may be suitable for most situations, the can lid described hereinbelow includes two arcuately spaced code patches which are identical, and which afford reading redundancy to obviate errors resulting from defacing or dirtiness of one of the code patches.

Various other objects and advantages which are attained by the invention will become more fully apparent as the description which now follows is read in conjunction with the accompanying drawings.

DESCRIPTION OF THE DRAWINGS

FIG. 1 is a perspective view illustrating a carbonated beverage can on its side including a lid constructed in accordance with the present invention.

FIG. 2 is an enlarged lid-end view of the can of FIG. 1.

FIG. 3 is a fragmentary, developed sectional view, on a larger scale than FIG. 2, generally taken along the curved line 3—3 in FIG. 2, illustrating one type of code structure, utilizing a binary-code format, formed in the lid of FIGS. 1 and 2.

FIG. 4 is similar to FIG. 3, except that it illustrates another type of binary-format code structure.

FIG. 5 is a fragmentary detail, on a larger scale than FIGS. 3 and 4, taken generally in the area indicated by double-ended curved arrow 5—5 in FIG. 2, illustrating a further modified type of binary-format code structure.

FIG. 6 is a view similar to FIG. 2, but on a somewhat larger scale, showing a frequency-type code format.

DETAILED DESCRIPTION OF THE INVENTION

Turning now to the drawings, and referring first to FIG. 1, indicated generally at 10 is a carbonated beverage can of a conventional shape and size, including lid structure constructed in accordance with the present invention. Can 10 includes two main parts—a conventional unitary body 12, including a cylindrical side wall 12a and a base 12b, and a unique lid 14 joined to wall 12a and structured according to features of the invention. In order to simplify the drawings, lid 14 is shown without the usual opening structure.

Considering FIGS. 2 and 3 along with FIG. 1, formed in the outer face of lid 14 are two diametrically spaced, arcuately distributed code patches 16, 18. In lid 14, patches 16, 18 are distributed, generally speaking, along a circular path, shown in dashed lines at 20 in FIG. 1, which is centered on the axis 22 of can 10. As will be explained, the information contained in these two code patches is identical, and is intended to provide for what is referred to herein as reading redundancy.

Directing attention to code patch 16 and "reading" along the patch in a clockwise direction in FIGS. 1 and 2, and from left to right in FIG. 3, the patch includes a plurality of radially extending linear indentations or valleys, such as those shown at 24. These indentations are also referred to herein as code elements. Progressing in the direction just mentioned through patch 16, one first encounters a group of three indentations, then a single blank space, a pair of indentations, another blank space, six indentations, another blank space, and finally, two indentations. The code format used in patch 16 is a binary format, with the presence of an indentation representing a binary "1", and a blank space representing a binary "0". Thus, the binary code embodied in patch 16 is as follows: 1-1-1-0-1-1-0-1-1-1-1-1-0-1-1.

While different particular dimensions may be used, the following dimensions characterize the construction and layout of patch 16. The patch occupies an arc of about 20°, indicated by angle A, with each indentation having a length of about 0.875-inches, a width of about 0.004-inches, and a depth of about 0.003-inches, and with the outer ends of each indentation being spaced from the periphery of lid 14 by about 0.3-inches.

The particular binary code just described which is embodied in patch 16 is, of course, arbitrary herein merely for the purpose of explanation. However, it will be understood by those skilled in the art that such a code is readily capable of providing unique identification for a particular state and for a particular producer of the product contained in can 10.

Returning for a moment to the issue mentioned earlier of reading redundancy, it will be noted that as one progresses through code patch 18, in the same angular direction as through code patch 16, one encounters exactly the same code. Such redundancy, while not necessary in all instances, is convenient, and preferred, in the event that there is some defacing or other marring of the outer face of lid 14 which might prevent reading of one of the patches.

It is intended that the code which is structured in patches 16, 18 be readable through the use of electromagnetic radiation, such as through the action of a circularly swept laser beam. Referring to FIG. 1, a laser source for this purpose is represented as a dot generally at 26. The beam from this source is swept in any suitable manner, as by a rotating mirror (not shown), to impinge the outer face of lid 14 along a circular path like that indicated by dashed line 20. Reflections from the lid are read through a suitable conventional optical system (also not shown) to detect changes in reflectance which occur as the point of impingement sweeps through the code patch. These reflectance changes are then decoded conventionally to provide the information contained in the patch.

FIGS. 4 and 5 show, in a lid still designated 14, two different structures for code patchs somewhat like patch 16, each embodying a binary-type code. In FIG. 4, a code patch 26 is shown which takes the form of radially extending linear ridges, or code elements, like those shown at 28 in FIG. 4. These ridges have substantially the same dimensional characteristics and angular dispositions as the valleys in code patch 16.

The code structure illustrated in FIG. 5, depicted in a fragment of a code patch 29, is formed by the printing, on the outer face of lid 14, of radially extending lines, or code elements, such as those shown at 30, using a printing medium which produces a light-reflectance contrast, vis-a-vis the surrounding areas of the outer face of the lid. Lines 30 have lengths, widths, and angular orientations similar to those of indentations 24 and ridges 28.

FIG. 6 illustrates the outer face of a lid, still numbered 14, which is formed with a frequency-type code. Two patches utilizing this type of code are shown at 32, 34—these patches being diametrically opposed, and alike in contained coded information. Referring to patch 32, it includes one group 32a of radially extending linear indentations, such as indentations 36, which are uniformly angularly spaced by one preselected angle B, and another group 32b of similar indentations equally angularly spaced by an angle C which has substantially twice the value of angle B. Thus, the code contained in patch 32 will, when swept by a laser beam like that described in conjunction with FIG. 1, be read as a two-frequency code, with the indentations in group 32a producing one response frequency, and the indentations in group 32b producing another response frequency which is substantially one-half that of the first-mentioned frequency. Frequency-coded patches, like patches 32, 34 may be formed not only as linear indentations, but also as linear ridges and linear printed lines, like those described in conjunction with FIGS. 4 and 5, respectively. Also, while in FIG. 6 the lid is structured with a two-frequency code format, different numbers of frequencies may be used where desired. Obviously, the exact frequency which is produced by a group of code lines, such as in group 32a, depends upon the relative angular velocity between the face of the lid and the point of impingement of the laser beam.

It should thus be apparent how the advantages ascribed above to the invention are achieved by a lid structure, such as the several lid structures shown and described herein. Lids, which, as explained, are prepared separately from can bodies, can easily be encoded specially to contain redemption information indigenous to different selected regions—in a manner which is in no way disruptive to the production of can bodies carrying UPC codes that are general in nature, i.e., not specific to any particular state or region. The lid and code structures, and formats, described herein are readily scanned, or otherwise viewed, by an electromagnetic beam, such as a laser beam, for high-speed accurate reading. In this regard, while laser-beam reading has been described, it should be understood that other electromagnetic wave reading systems, such as an ultraviolet light system with a printed code, can readily be used. And, as mentioned earlier, while a single code patch is probably sufficient in most applications, through utilizing at least a second code patch which is duplicative, reading redundancy is provided to minimize the kinds of possible reading errors suggested earlier.

Naturally, information, in addition to redemption information, may be encoded on lid structures where desired.

While code structures and formats have been described herein including linear code elements which, in particular, "radiate" from the axis of revolution of a can lid, it is appreciated that similar lid code structures may be used employing code patches wherein code line elements, strictly speaking, are not radial with respect to the axis. In this regard, the phrase "generally radiate" used herein is intended to define all of such different types of code element arrangements.

Thus, while a preferred embodiment, and several modifications, of the present invention have been shown and described herein, it is appreciated that other variations are possible without departing from the spirit of the invention.

It is claimed and desired to secure by Letters Patent:

1. In a redeemable carbonated beverage container or the like including a cylindrical side wall, and intended for distribution in a selected region, a generally circular lid having inner and outer faces for joining with and closing off one axial end of said side wall, and means formed with said lid defining, on the outer face thereof, an arcuately distributed, electromagnetic-wave-readable code unique to such region including redemption-code information, said code including code elements located along lines which generally radiate from the axis of revolution of said lid.

2. The container of claim 1, wherein said code elements are spaced angularly relative to one another in a pattern of presences and absences which embodies the coded information.

3. The container of claim 2, wherein said code elements are elongated and linear in nature.

4. The container of claims 1, 2 or 3, wherein said code elements take the form of axial depressions in said outer face.

5. The container of claims 1, 2 or 3, wherein said code elements take the form of axial projections from said outer face.

6. The container of claims 1, 2 or 3, wherein said code elements take the form of printing on said outer face, which printing has an electromagnetic-wave-reflectance characteristic which differs from that of adjacent areas on the outer face.

7. The container of claims 1, 2 or 3, wherein said code elements are arranged to form a binary-type code.

8. The container of claims 1, 2 or 3, wherein said code elements are arranged to form a frequency-type code.

9. The container of claims 1, 2 or 3 which further includes a second code-defining means, like said first-mentioned code-defining means, but located at a region displaced on the lid angularly from the latter for the purpose of affording code-reading redundancy.

* * * * *